(12) United States Patent
Hesselmann et al.

(10) Patent No.: US 10,314,238 B2
(45) Date of Patent: Jun. 11, 2019

(54) BLOCK BALING PRESS

(71) Applicant: USINES CLAAS FRANCE S.A.S., Woippy (FR)

(72) Inventors: Ulrich Hesselmann, Sarrebourg (DE); Thorsten Scharf, Mettlach (DE); Stefan Birkhofer, Stocknach (DE)

(73) Assignee: Usines CLAAS France S.A.S., Woippy (FR)

( * ) Notice: Subject to any disclaimer, the term of this patent is extended or adjusted under 35 U.S.C. 154(b) by 876 days.

(21) Appl. No.: 14/678,062

(22) Filed: Apr. 3, 2015

(65) Prior Publication Data

US 2015/0282429 A1 Oct. 8, 2015

(30) Foreign Application Priority Data

Apr. 7, 2014 (DE) .................. 10 2014 004 920

(51) Int. Cl.
*B30B 9/30* (2006.01)
*A01F 15/04* (2006.01)
*A01F 15/08* (2006.01)

(52) U.S. Cl.
CPC .......... *A01F 15/046* (2013.01); *A01F 15/042* (2013.01); *A01F 15/08* (2013.01); *A01F 15/0825* (2013.01); *B30B 9/3003* (2013.01); *B30B 9/3021* (2013.01)

(58) Field of Classification Search
CPC ...... A01F 15/042; A01F 15/046; A01F 15/08; A01F 15/0825; B30B 9/3021
USPC .................................................... 100/179, 3
See application file for complete search history.

(56) References Cited

U.S. PATENT DOCUMENTS

| 3,036,514 | A | * | 5/1962 | McDuffie | ............... | A01F 15/14 |
| | | | | | | 100/187 |
| 3,095,802 | A | * | 7/1963 | Nolt | ....................... | A01F 15/08 |
| | | | | | | 100/187 |
| 3,099,203 | A | * | 7/1963 | Klemm | .................. | A01F 15/08 |
| | | | | | | 100/19 R |
| 3,782,275 | A | * | 1/1974 | Webster | ............... | A01F 15/042 |
| | | | | | | 100/179 |

(Continued)

FOREIGN PATENT DOCUMENTS

| DE | 3940979 A1 | * | 6/1991 | .......... | B30B 9/3003 |
| DE | 10 2010 037 722 | | 3/2012 | | |
| GB | 398144 | | 9/1933 | | |

OTHER PUBLICATIONS

Machine Translation of DE3940979, 7 Pages.*

*Primary Examiner* — Gregory D Swiatocha
(74) *Attorney, Agent, or Firm* — Collard & Roe, P.C.

(57) ABSTRACT

A block baling press has a bale chamber and a baling ram moveable in the bale chamber in an oscillating manner to compress bale material. An end face of the baling ram facing the bale material is divided into ram segments separated from one another by needle slots. At least a first needle slot is flanked by ram segments with a profiling transverse to the first needle slot. The profiling brings about a weaker compression of the bale material in an edge region of the ram segments adjacent to the first needle slot than in a region of the ram segments spaced apart from the first needle slot. Bales are obtained in which zones of high compression and low compression alternate across the width of the bale chamber. The bales are held together by twine placed around the zones having low compression.

11 Claims, 2 Drawing Sheets

(56) References Cited

U.S. PATENT DOCUMENTS

| | | | |
|---|---|---|---|
| 4,829,756 A * | 5/1989 | Schrag | A01F 15/042 100/179 |
| 4,945,719 A * | 8/1990 | Schrag | A01F 15/042 100/179 |
| 8,813,642 B2 | 8/2014 | Arnould et al. | |
| 2010/0242749 A1* | 9/2010 | Demulder | A01F 15/042 100/179 |

* cited by examiner

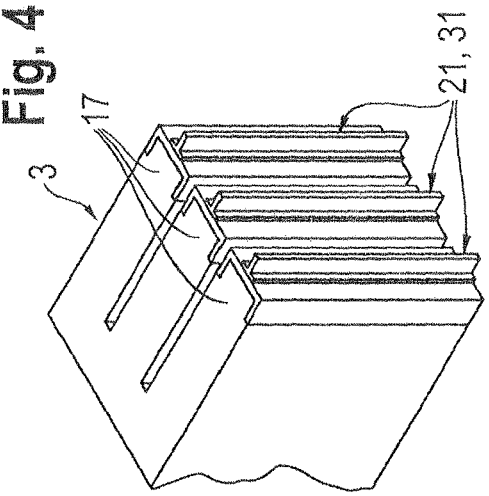
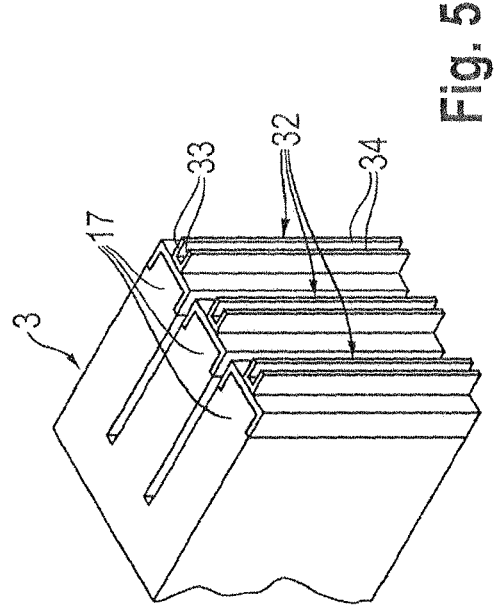
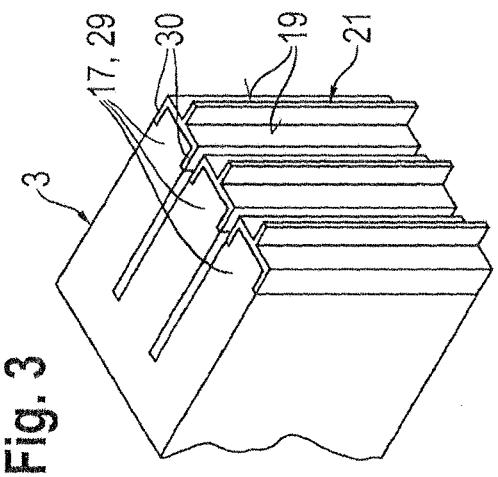
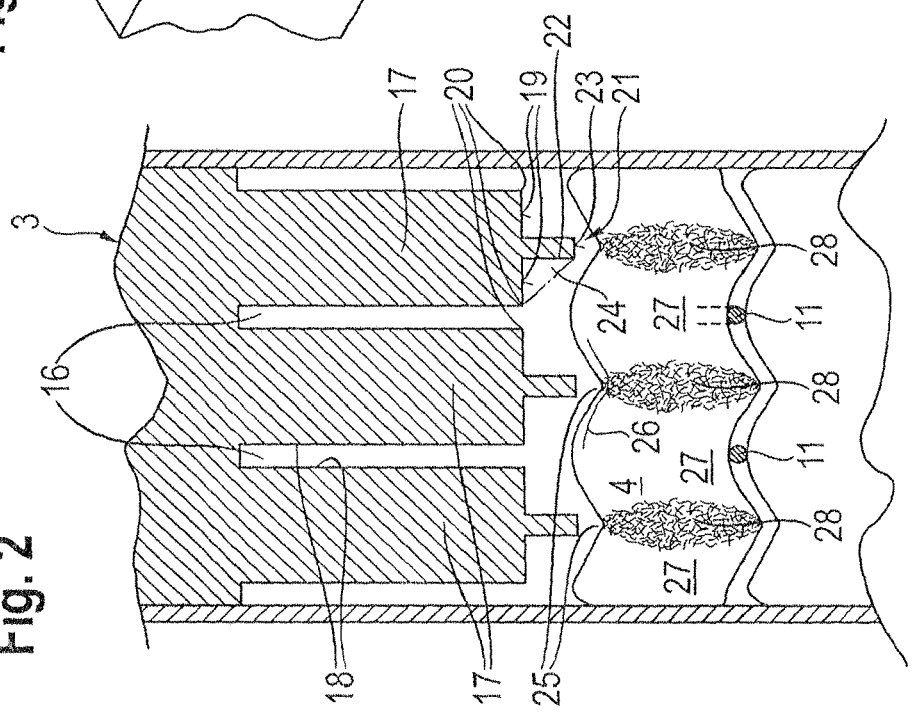

BLOCK BALING PRESS

CROSS-REFERENCE TO A RELATED APPLICATION

The invention described and claimed hereinbelow is also described in German Patent Application DE 10 2014 004 920.5, filed on Apr. 7, 2014. The German Patent Application, the subject matters of which is incorporated herein by reference, provides the basis for a claim of priority of invention under 35 U.S.C. 119(a)-(d).

BACKGROUND OF THE INVENTION

The present invention relates to a baler used to press agricultural crop such as straw, hay or silage into cuboid bales.

Balers are known to comprise a bale chamber and a ram that moves in the bale chamber in an oscillating manner in order to compress bale material. Such a known baler is described in DE 10 2010 037 722 A1, for example.

In order to ensure that crop is compressed in such a bailer retains its bale shape upon exiting the bale chamber, the bales in the bale chamber must be wrapped with twine and the twine must be tied into a knot. While the bale is being produced, the twine tightens along the flanks of the bale and along the back side of the bale, which faces away from a baling ram. When the bale is finished, the twine also must be placed on the front side of the bale that faces the baling ram in order to be tied into a knot. To this end, it is known to provide the baling ram with so-called needle slots. Needle slots are open toward the bale and through which the needles, which guide the twine, are moved while the baling ram holds the bale under pressure.

Every time the baling ram is spaced apart from the front side of the newly created bale, new bale material is introduced into the bale chamber. Consequently, the bale becomes longer and the twine being drawn on the flanks and the back side of the bale must slip along the bale. The twine is thereby subjected to considerable loads with every compacting movement of the ram. If this causes the twine to tear or slip out of its holder, the bale cannot be knotted. The operation of the baler must be interrupted and the bale chamber must be emptied, which considerably lowers productivity. Although the risk of tearing is reduced by using stronger twine, using stronger twine increases costs. For that matter, the use of such strong twine makes it more difficult to subsequently cut open the bales. And in addition, the use of strong twine does not lower the risk of the twine being torn out of its holder during the compressing process.

Therefore, there is a need for a block baling press and a method for producing bales, with which a strong compression of the bale material can be achieved while also minimizing the risk of the twine tearing or slipping out of its holder.

SUMMARY OF THE INVENTION

The present invention overcomes the shortcomings of known arts, such as those mentioned above.

To that end, the present invention provides a block baling press comprising a bale chamber with a baling ram that moves in the bale chamber in an oscillating manner in order to compress bale material, where an end face of the bailing ram that faces the bale material is divided into ram segments separated from one another by needle slots. At least a first needle slot is flanked by ram segments that have a profiling transverse to the first needle slot, which brings about a weaker compression of the crop in an edge region of the ram segments adjacent to the first needle slot than in a region of the ram segments spaced apart from the first needle slot.

By use of the inventive block baling press, the bale material is compressed in the bale chamber to form a compressed body in which zones of high compression and zones of low compression alternate across the width of the bale chamber. Given that the twine is placed around a zone having low compression and is knotted, the tension or friction to which the twine is exposed during the compression process is held relatively low despite a high mean density of the bale. Consequently, the risk that the twine will tear or slip out of its holder is reduced by use of the invention.

The baling ram comprises a plurality of needle slots extending next to one another. In order to ensure that the compression of the bale at each of these needle slots is relatively low, the highly compressed, spaced-apart region of at least one of the ram segments is a central region of the ram segment, which extends between the needle slots and is spaced apart from both.

The high compression of the bale material is achieved as the spaced-apart region extends, in the direction of the bale material, from the edge region of the ram segment adjoining the first needle slot.

In order to obtain high compression of bale material that is exposed to the spaced apart region of the ram segment, it is useful, furthermore, for the bale material to be displaced, during compression, toward the highly compressed zones of the bale, wherein the displacement is transverse to the direction of movement of the ram. As is discussed in greater detail further below, such a displacement is supported in that the edge region is part of a concavity of the ram segment, which extends between a corner of the ram segment adjoining the needle slot and the spaced-apart region.

In an embodiment, the edge region comprises a planar surface oriented perpendicularly to the direction of movement of the baling ram, wherein the planar surface is part of the aforementioned concavity. Furthermore, the concavity preferably is bordered by a side wall of the spaced-apart region. In order to promote the lateral displacement of bale material toward the highly compressed zone, a surface normal of the side wall is oriented at a right angle to the direction of movement of the ram, but at least at an angle of 60° relative thereto.

The width of the spaced-apart region should be small compared to the width of the ram segment and, preferably, smaller than the spacing between the spaced-apart region and an adjacent needle slot.

In order to obtain sufficient inhomogeneity of the compression between highly compressed zones and weakly compressed zones, the extension of the spaced-apart region of a ram segment away from the adjacent edge region corresponds to at least one-fourth the width of the ram segment.

The spaced-apart region preferably does not cut through the bale material, since this would prevent displacement of the bale material transversely to the direction of movement of the ram. The spaced-apart region is therefore not designed as a type of knife, but rather has a flat or concave apex surface facing the bale material.

The ram segment is designed as a U-shaped profile, in particular, the legs of which face away from the bale material and border the needle slots of the ram. The spaced-apart region is then be formed by at least one rib, which is integrally formed on a central piece of the U-shaped profile.

As an alternative, the spaced-apart region is formed separately from the ram segment, in particular, by a T-shaped or U-shaped profile joined to the ram segment. Such a profile has the advantage that conventional block baling presses are easily retrofitted with such a profile.

BRIEF DESCRIPTION OF THE DRAWINGS

Further features and advantages of the invention will become apparent from the description of embodiments that follows, with reference to the attached figures, wherein:

FIG. 2 depicts a schematic longitudinal view of the bale chamber of the baler from FIG. 1;

FIG. 3 depicts a schematic illustration of a baling ram according to a first embodiment;

FIG. 4 depicts a view according to a second embodiment, which is analogous to FIG. 3; and FIG. 5 depicts a view according to a third embodiment, which is analogous to FIG. 3.

DETAILED DESCRIPTION OF THE PREFERRED EMBODIMENTS

Figure 1:
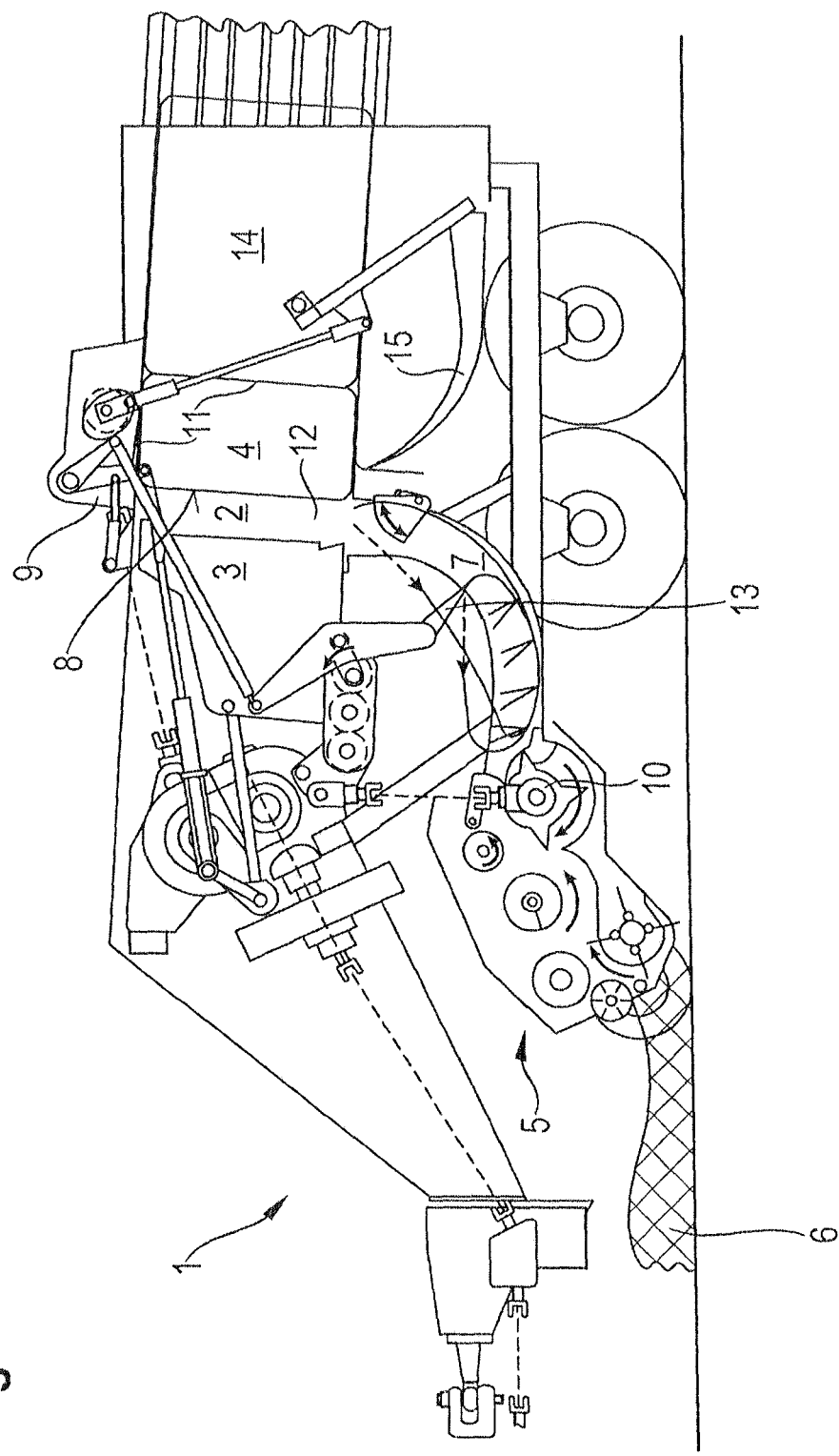
FIG. 1 depicts a side view of a baler according to the present invention.

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives failing within the spirit and scope of the present invention, as defined by the appended claims.

The baler 1, as shown in a schematic side view in FIG. 1, is designed as a trailer that is coupled to a non-illustrated towing vehicle and is driven by a P.T.O. shaft thereof. The baler 1 comprises a receiving device 5 (which is also referred to as a pick-up), for picking up crop 6 from the ground, a cutting device 10 for chopping the crop, a bale chamber 2 and a feed channel 7 that connects the cutting device 10 to the bale chamber 2. A baling ram 3 moves in the bale chamber 2 in an oscillating manner. In FIG. 1, the baling ram is shown in a retracted position in which the baling ram unblocks a passage 12 from the feed channel 7 to the bale chamber 2.

Agitator tines 13 move on a path that extends partially outside of the feed channel 7 and partially through slots in a wall of the feed channel 7, thereby engaging into the feed channel to push crop fed by the cutting device 10 into the feed channel 7 through the open passage 12 into the bale chamber 2. In the bale chamber 2, the crop is pressed against a bale 4 that is being formed by a subsequent pressing movement of the baling ram 3 and is compressed.

A knotter 9, against which the end of a twine strand 11 is clamped, is disposed above the baling chamber 2, approximately at the level of the end face 8 of the bale 4 facing the baling ram 3. The twine strand 11 extends along a top side of the bale 4, over the back side thereof, which faces a finished bale 14, on the underside of the bale 4 along the tip of a knotter needle 15 and, from there, to a non-illustrated twine supply. When the bale 4 has reached an intended size, the knotter needle 15 is pivoted upward in order to pull the twine strand over the end face 8 of the bale 4 and up to the knotter 9 such that the twine strand is severed by the knotter 9 and tied into a knot with the end of the strand, which is fixedly held there. This upward movement of the knotter needle 15 extends through needle slots, which are formed in the end face of the baling ram 3.

FIG. 2 shows a section through the bale chamber 2 along a plane extending in the longitudinal direction thereof. Therein, the baling ram 3 is divided into three ram segments 17 by only two needle slots 16; in practical application, the number thereof is generally greater. The needle slots 16 are shown here with flat side walls 18, which extend in the direction of movement of the baling ram 3. In order to minimize the penetration of the bale material into the needle slots 16, the needle slots 16 have an undercut shape, the width of which in a rear region is large enough to permit passage of the knotter needles 15, while, in a front region, at the level of the ram segments 17, the width of the needle slots 16 just suffices to allow the twine strand 11 introduced by the knotter needle 15 into the needle slot 16 to emerge therefrom.

The ram segments 17 each have two planar surfaces 19, which face the bale 4, are oriented perpendicularly to the direction of movement of the baling ram 3 and meet the side walls 18 of the needle slots 16 at the corners 20. A rib having flanks 22 and an apex surface 23 is formed in a region 21 spaced apart from the corners 20, in the center of each of the ram segments 17. The rib extends in front of the planar surfaces 19. The planar surfaces 19 and flanks 22 together form a concavity 24 in each case, which extends across the entire level of a ram segment 17 and in which a surface of the baling ram 3 is recessed behind an imaginary connecting line between a corner 20 and an adjacent edge of the apex surface 23.

When the baling ram 3 advances against the bale 4, the end faces or apex surfaces 23 of the region 21 have the first contact and form grooves 25 in the end face 8 of the bale 4. A result of this deformation is that a stalk 26 of the crop, which crosses the apex surface 23 of one of the ram segments 17, is pressed deeply into the bale 4 by the apex surface 23. The stalk 26 is bent thereby and presses against the flanks 22 on both sides of the apex surface 23. Crop is thereby displaced within the bale 4, transversely to the direction of motion of the baling ram 3, from a zone 27, which is disposed opposite a needle slot 16 and planar surfaces 19 adjacent thereto, into a zone 28, which is disposed opposite the apex surface 23, such that, when the bale 4 is finished, zones 28 of high compression alternate with zones 27 of low compression across the width of said bale.

Since the twine strands 11 each extend in a plane that is aligned with the needle slots 16, around a zone 27 of low compression, the pressure of the bale 4 to which the twine strands are exposed is relatively low, and therefore the twine around the bale 4 can slip when the bale grows due to continuously supplied crop and thereby expands in the bale chamber 2. Therefore, despite a high mean compression of the bale material in the bale 4, the load on the twine is held within limits and the risk of the twine tearing or slipping out of the holder on the knotter 9 can be kept low.

FIG. 3 shows the baling ram 3 in a schematic, perspective view according to an embodiment. The ram segments 17 are each formed by extruded parts 29 in this case. The extruded parts 29 are modified U-shaped profiles having a central piece that forms the planar surfaces 19, and outer legs 30, which form at least parts of the side walls 18 of the needle slots 16 and extend at right angles to the central piece. One rib forms the spaced-apart region 21 and extends away from the central piece, in the center thereof, in the direction opposite to that of the outer legs 30.

In an embodiment shown in FIG. 4, the spaced-apart region 21 is formed by a T-shaped profile 31, which is joined to the ram segment 17 (formed as a conventional U-shaped profile in this case), using screws, rivets, or the like. Such T-shaped profile 31 are easily retrofitted, in general, with flat ram segments 17 between the needle slots 16 in order to enable the present invention to be implemented.

In FIG. 5, the T-shaped profile 31 is replaced by a U-shaped profile 32, the central piece of which is fastened on the piston segment 17 via screwing, riveting, or any other method, and the outer legs 33 of which extend in the direction of the bale 4. The spacing between the legs 33 of the U-shaped profile 32 is small, and is similar to the width of the needle slots 16. Accordingly, the bale material substantially does not enter the space between the legs 33, and the corners 34 of the two legs 33 facing the bale 4 can be interpreted as a single concave apex surface. In a manner analogous to the apex surface 23, the effect of the corners 34 of the two legs 33 facing the bale 4, on the bale material, substantially corresponds to that of the flat apex surface 23.

REFERENCE CHARACTERS 1 baler
2 bale chamber
3 baling ram
4 bale
5 receiving device
6 crop
7 feed channel
8 end face
9 knotter
10 cutting device
11 twine strand
12 passage
13 agitator tines
14 bale
15 knotter needle
16 needle slot
17 ram segment
18 side wall
19 planar surface
20 corner
21 spaced-apart region
22 flank
23 apex surface
24 concavity
25 groove
26 stalk
27 zone of low compression
28 zone of high compression
29 extruded part
30 outer leg
31 T-shaped profile
32 U-shaped profile
33 outer leg
34 corner As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A block baling press, comprising:
a bale chamber; and
a baling ram moveable in the bale chamber in an oscillating manner to compress bale material;
wherein an end face of the baling ram facing the bale material is divided into ram segments separated from one another by needle slots;
wherein at least a first needle slot is flanked by the ram segments each comprising a rib having a rectangular cross section and extending outward from a longitudinal center of the respective ram segment along an entire vertical length of each ram segment, the vertical length being perpendicular to a width direction of each ram segment and perpendicular to a direction of movement of the baling ram, and flanked by two planar surfaces of equal width, the planar surfaces forming edge regions oriented perpendicularly to the direction of movement of the baling ram, to bring about a weaker compression of the bale material in the edge regions of the ram segments adjacent to the first needle slot than in a region of the rib.

2. The block baling press according to claim 1, wherein each of the edge regions is part of a concavity of the ram segment that extends between a corner of the ram segment adjoining the needle slot and the rib.

3. The block baling press according to claim 2, wherein the concavity is bordered by a flank of the rib.

4. The block baling press according to claim 3, wherein a surface normal to the flank is oriented at an angle of at least 60° relative to the direction of movement of the baling ram.

5. The block baling press according to claim 4, wherein the flank angle orientation is 90°.

6. The block baling press according to claim 1, wherein a width of the rib is smaller than a spacing between the rib and an adjacent needle slot.

7. The block baling press according to claim 1, wherein an extension of the rib away from the planar surfaces is at least one-fourth of a width of the ram segment.

8. The block baling press according to claim 1, wherein the rib has a flat or concave apex surface that faces the bale material.

9. The block baling press according to claim 1, wherein the rib and adjoining planar surfaces form a T-shaped profile joined to one of the ram segments.

10. A block baling press, comprising:
a bale chamber; and
a baling ram moveable in the bale chamber in an oscillating manner to compress bale material;
wherein an end face of the baling ram facing the bale material is divided into ram segments separated from one another by needle slots;
wherein at least a first needle slot is flanked by the ram segments, wherein each ram segment has two ribs forming a U-shaped profile extending along an entire vertical length of each ram segment, the vertical length being perpendicular to a width direction of each ram segment and perpendicular to a direction of movement of the baling ram, in a longitudinal central region of the ram segments and flanked by two planar surfaces of equal width, the planar surfaces forming edge regions oriented perpendicularly to the direction of movement of the baling ram, to bring about a weaker compression of the bale material in the edge regions of the ram segments adjacent to the first needle slot than in a region of the ribs, and wherein a spacing between the ribs in the U-shaped profile is smaller than a spacing between the U-shaped profile and an adjacent needle slot.

11. A method for producing a bale from bale material, comprising steps of:
   compressing bale material in a bale chamber to form a compressed body in which zones of high compression and zones of low compression alternate across the width of the bale chamber, the step of compressing being accomplished with a baling ram moveable in the bale chamber in an oscillating manner to compress the bale material, wherein an end face of the baling ram facing the bale material is divided into ram segments separated from one another by needle slots, wherein at least a first needle slot is flanked by the ram segments each comprising a rib having a rectangular cross section and extending outward from a longitudinal center of the respective ram segment along an entire vertical length of each ram segment, the vertical length being perpendicular to a width direction of each ram segment and perpendicular to a direction of movement of the baling ram and flanked by two planar surfaces of equal width, the planar surfaces forming edge regions oriented perpendicularly to the direction of movement of the baling ram, to bring about a weaker compression of the bale material in the edge regions of the ram segments adjacent to the first needle slot than in a region of the rib; and
   placing twine around the zones having low compression and knotting the twine.

* * * * *